(12) United States Patent
Milton

(10) Patent No.: US 10,371,182 B2
(45) Date of Patent: Aug. 6, 2019

(54) COMPRESSION WEDGE

(71) Applicant: Roxtec AB, Karlskrona (SE)

(72) Inventor: Stefan Milton, Ramdala (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 15/571,742

(22) PCT Filed: May 3, 2016

(86) PCT No.: PCT/SE2016/050403
§ 371 (c)(1),
(2) Date: Nov. 3, 2017

(87) PCT Pub. No.: WO2016/178625
PCT Pub. Date: Nov. 10, 2016

(65) Prior Publication Data
US 2018/0156253 A1     Jun. 7, 2018

(30) Foreign Application Priority Data
May 4, 2015    (SE) ..................................... 1550564

(51) Int. Cl.
*F16L 5/08*      (2006.01)
*F16B 2/14*      (2006.01)
(Continued)

(52) U.S. Cl.
CPC ..................... *F16B 2/14* (2013.01);
*F16L 5/08* (2013.01); *F16L 5/14* (2013.01);
*H02G 3/22* (2013.01); *F16L 2201/10* (2013.01)

(58) Field of Classification Search
CPC ....... F16B 2/14; F16L 5/08; F16L 5/14; F16L 2201/10; H02G 3/22
See application file for complete search history.

(56) References Cited

U.S. PATENT DOCUMENTS 3,282,544 A * 11/1966 Brattberg ................ F16L 3/227
                                                   248/56
4,291,195 A * 9/1981 Blomqvist ............... H02G 3/22
                                                   174/505
(Continued)

FOREIGN PATENT DOCUMENTS

CN         1160438 A     9/1997
DE         2654806 A1    6/1978
(Continued)

OTHER PUBLICATIONS

International Search Report and Written Opinion for PCT/SE2016/050403 dated Jun. 14, 2016.
(Continued)

*Primary Examiner* — Gilbert Y Lee
(74) *Attorney, Agent, or Firm* — Merchant & Gould P.C.

(57) ABSTRACT

The present invention concerns a wedge comprising four wedge elements (1, 2, 3, 4). A first wedge element (1) and a second wedge element (2) are arranged moveable towards and away from each other. A third wedge element (3) and a fourth wedge element (4) are placed on opposite sides of the first two wedge elements (1, 2) abutting the two first wedge elements (1, 2) along sloping surfaces. The third and fourth wedge elements (3, 4) will be moved away from each other when the first and second wedge elements (1, 2) are moved toward each other and will be free to move toward each other when the first and second wedge elements (1, 2) are moved away from each other. The movement is accomplished in that a first part (7) is fixed rotatable in the first wedge element (1) and that a second part (6, 40) is fixed non-rotatable in the second wedge element (2). The first and second parts (7, 6, 40) have co-operating threads that are so arranged that the first and second parts (7, 6, 40) will move (Continued)

relative each other when the first part (7) is rotated relative the second part (6, 40).

12 Claims, 3 Drawing Sheets

(51) Int. Cl.
  *H02G 3/22* (2006.01)
  *F16L 5/14* (2006.01)

(56) References Cited

U.S. PATENT DOCUMENTS

| | | | | |
|---|---|---|---|---|
| 4,677,253 A * | 6/1987 | Blomqvist | ............... | H02G 3/22 174/362 |
| 4,702,444 A * | 10/1987 | Beele | ............... | H02G 3/22 174/151 |
| 4,771,136 A * | 9/1988 | Graver | ............... | H02G 3/22 174/362 |
| 5,783,776 A * | 7/1998 | Birmingham | ............. | F16L 5/08 174/657 |
| 5,938,152 A * | 8/1999 | Kreutz | ............... | F16L 5/08 174/656 |
| 8,096,562 B2 * | 1/2012 | Johansson | ............... | F16L 5/08 174/40 CC |
| 9,982,804 B2 * | 5/2018 | Johansson | ............... | H02G 3/22 |
| 2003/0110719 A1 | 6/2003 | Broder | | |
| 2009/0315273 A1 | 12/2009 | Johansson et al. | | |

FOREIGN PATENT DOCUMENTS

| | | |
|---|---|---|
| DE | 3828012 C2 | 1/1993 |
| KR | 20100090583 A | 8/2010 |
| SE | 412820 B | 3/1980 |
| WO | WO 96/11353 A1 | 4/1996 |
| WO | WO 2014/005919 A2 | 1/2014 |
| WO | WO 2014/054848 A1 | 4/2014 |

OTHER PUBLICATIONS

Search Report for European Patent Application No. 16789690.1, dated Nov. 20, 2018.
Office Action for Chinese Patent Application No. 201680025611.9, dated Jan. 25, 2019.

* cited by examiner

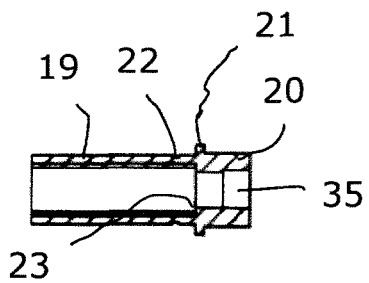
Fig. 9
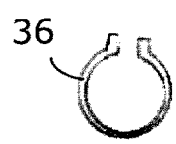
Fig. 10
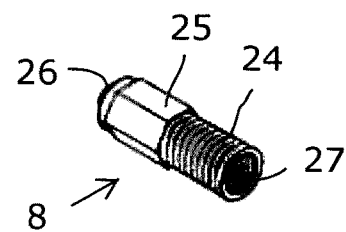
Fig. 11
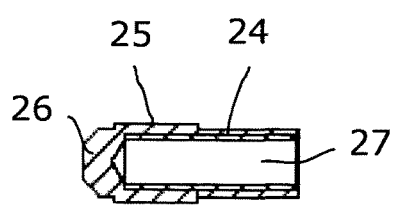
Fig. 12
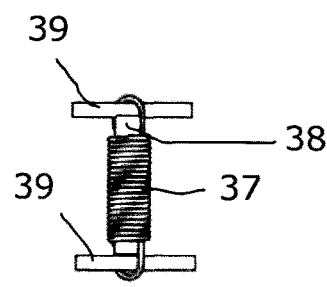
Fig. 13
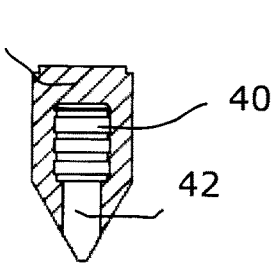
Fig. 14
Fig. 15
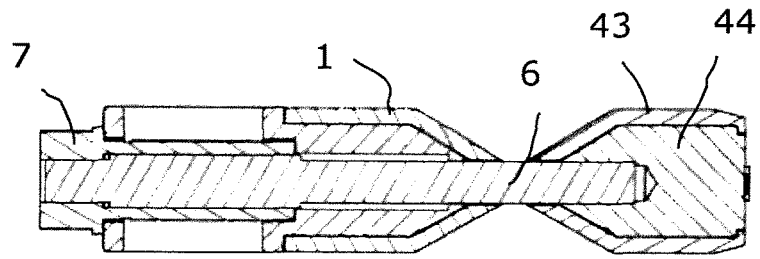
Fig. 16

COMPRESSION WEDGE

This application is a National Stage Application of PCT/SE2016/050403, filed 3 May 2016, which claims benefit of Swedish Patent Application No. 1550564-7, filed 4 May 2015, which applications are incorporated herein by reference. To the extent appropriate, a claim of priority is made to each of the above disclosed applications.

TECHNICAL FIELD

The present invention concerns a wedge for a lead-through system, which wedge is moveable between a non-compression state and a compression state.

PRIOR ART

The present invention is mainly intended for a lead-through system comprising a frame, a number of modules, stay plates and a wedge. The modules, stay plates and the wedge are placed inside the frame. The modules are made of a compressible material and each module is to receive a cable, pipe or wire. The function of the stay plates is to hinder the modules from going out of the frame in use. The wedge is a compression means which is to compress the modules in order for them to seal inwardly against the pipe, cable or wire and outwardly against other modules, stay plates and/or the frame.

Lead-through systems of this kind are used in many different environments, such as for cabinets, technical shelters, junction boxes and machines and also decks and bulkheads of ships. They are used in different industrial environments, such as automotive, telecom, power generation and distribution as well as marine and offshore. They may have to seal against fluid, gas, fire, rodents, termites, dust, moisture etc.

In one wedge according to prior art (WO 96/11353), the wedge is moved between a non-compression state and a compression state by means of two screws, whereby each screw has threads with opposite pitches. The screws are connected to two wedge elements, which are moved towards each other if the screws are turned in a first direction and away from each other if the screws are turned in the opposite direction. The threads of the screw are in mesh with threads of the wedge elements, whereby the threads of one of the wedge elements are in mesh with threads of a first pitch of the screws and the threads of the other wedge element are in mesh with threads of an opposite pitch of the screws. Two further wedge elements are placed on sloping surfaces on opposite sides of the two first wedge elements, whereby the two further wedge elements will be moved toward and away from each other depending on the movement of the two first wedge elements. When the two further wedge elements are moved away from each other the thickness of the wedge increases, giving a compression force when placed inside the frame.

To move the wedge between the non-compression state and the compression state, both screws have to be turned and it is normally done alternately. If the screws are not turned alternately it is a risk that the wedge elements connected to the screws will become skewed and possible lock further movements of the wedge elements. In lead-through systems of this kind it is vital that the compression force given by the wedge amount to a predetermined value. If the compression force is below said predetermined value there is a clear risk of not having a tight seal. In the wedge of prior art the decompression force is given when the screws are screwed out, whereby the distance between the screw heads and the wedge increases. Said distance is an indication of the applied compression force. Thus, the predetermined force is reached when the distance between the screw heads and the wedge amounts to a certain value. To establish that enough compression force has been applied said distance has to be measured. Such measuring is often cumbersome. In the wedge of the prior art there is no definite stops for the turning of the screws, which means that it is no way to know, without measuring the distance as discussed above, whether enough compression force has been applied or if unnecessarily high compression force has been applied.

SUMMARY

In view of the above, one object of the present invention is to provide a wedge for a lead-through system, which wedge is more easy to handle regarding activation and deactivation of the wedge and where it is more easy to accomplish the predetermined compression force.

According to one aspect of the present invention a wedge is provided, comprising four wedge elements. A first wedge element and a second wedge element are arranged moveable towards and away from each other. A third wedge element and a fourth wedge element are placed on opposite sides of the first two wedge elements abutting the two first wedge elements along sloping surfaces. The third and fourth wedge elements will be moved away from each other when the first and second wedge elements are moved toward each other and the third and fourth wedge elements will be free to move toward each other when the first and second wedge elements are moved away from each other. The movement is accomplished in that a first part is fixed rotatable in the first wedge elements and that a second part is fixed non rotatable in the second wedge element. The first and second parts have co-operating threads that are so arranged that the first and second parts will move relative each other when the first part is rotated relative the second part.

Further objects and advantages of the present invention will be obvious to a person skilled in the art when reading the detailed description below of at present preferred embodiments.

BRIEF DESCRIPTION OF THE DRAWINGS

The present invention will be described further below by way of example and with reference to the enclosed drawings. In the drawings:

FIG. 9 is a cross sectional view of the socket of FIG. 8, FIG. 10 is a plan view of a locking ring forming a part of the wedge in one embodiment of the present invention, FIG. 11 is a perspective view of a nut forming a part of the wedge in one embodiment of the present invention, FIG. 12 is a sectional view of the nut of FIG. 11, FIG. 13 is a side view of a spring arrangement forming a part of the wedge in one embodiment of the present invention, FIG. 14 is a perspective view of an alternative embodiment of the nut forming a part of the wedge in one embodiment of the present invention, FIG. 15 is a sectional view illustrating placement of the nut of FIG. 14 inside one wedge element, and FIG. 16 is a sectional view, corresponding with FIG. 6, of a wedge according to an alternative embodiment and with parts removed for clarity.

DETAILED DESCRIPTION OF EMBODIMENTS

Figure 1:
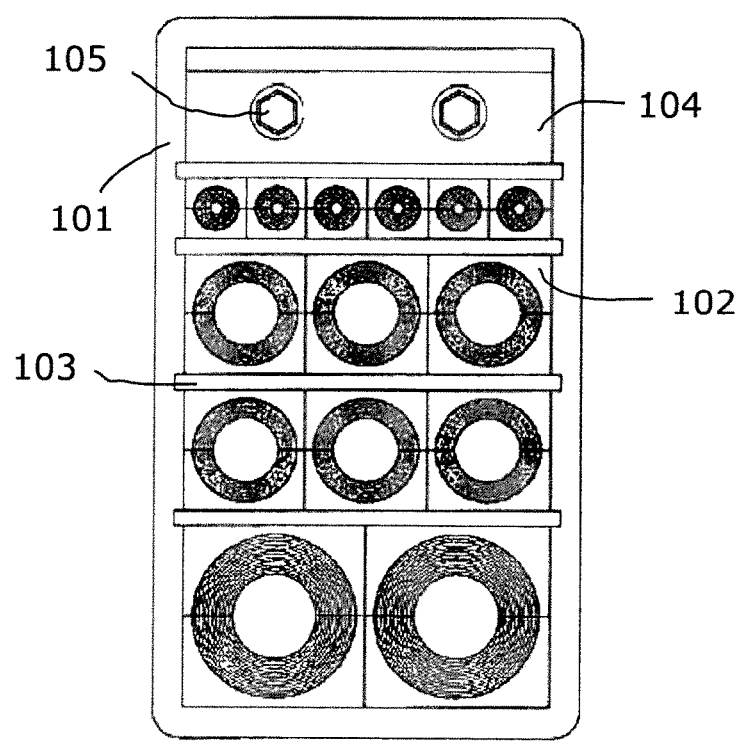
FIG. 1 is a front view of a lead-through system of the prior art, in which the wedge of the present invention may be used.
Figure 2:
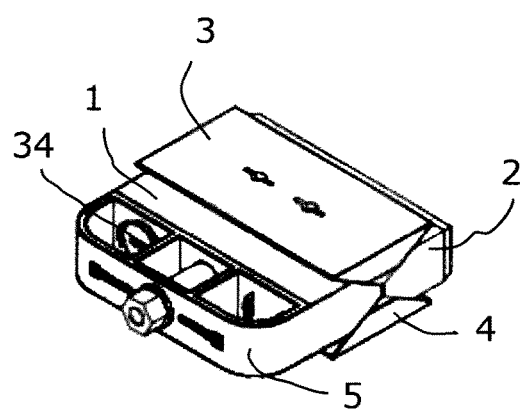
FIG. 2 is a perspective view of one embodiment of a wedge according to the present invention in a compressing state.
Figure 3:
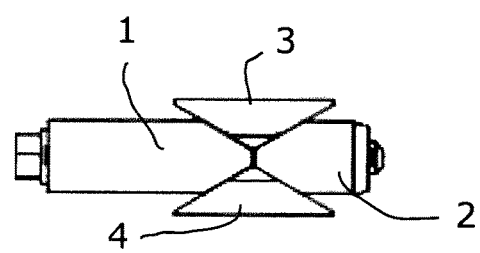
FIG. 3 is a side view of the wedge of FIG. 2.

The wedge of the present invention is intended for use in a lead-through system as exemplified in FIG. 1. The exact form of the different parts of the lead-through system may vary. In the shown embodiment according to prior art, a frame 101 receives a number of modules 102. The frame 101 is to be placed in a transition, such as a wall, roof or floor, and each module 102 is to receive a cable, wire or pipe. To assist in holding the modules 102 in place inside the frame 101, a number of stay plates 103 are arranged between each row of modules 102 inside the frame 101. The stay plates 103 are arranged moveable in longitudinal direction inside the frame 101, i.e. up and down as shown in FIG. 1. A wedge 104 according to prior art is placed at one inner end of the frame 101, with a stay plate 103 between the wedge 104 and the adjacent row of modules. The prior art wedge 104 is a compression unit and by means of screws 105 the wedge 104 can be expanded inside the frame 101. The expansion of the wedge 104 will act on the modules 102 inside the frame 101, whereby the modules 102 will be pressed against each other, against the stay plates 103, against the inner sides of the frame 101 and/or against any cable etc. received inside a module 102, depending on the placement of respective module 102.

The wedge of the present invention is to replace the prior art wedge 104 in a lead-through system, such as the one shown in FIG. 1. In a first embodiment the wedge of the present invention comprises a first wedge element 1, a second wedge element 2, a third wedge element 3 and a fourth wedge element 4. The wedge further comprises a handle 5, a screw 6, a socket 7 and a nut 8.

The first wedge element 1 has a core 9 of a harder material than the surrounding material. In the same way the second wedge element 2 has a core 10 of harder material, the third wedge element 3 has a core 11 of harder material and the fourth wedge element 4 has a core 12 of harder material. The wedge elements 1, 2, 3, 4 are made of the same material and the core 9, 10, 11, 12 of each wedge element 1, 2, 3, 4 is made of the same material. Each wedge element 1, 2, 3, 4 is made of an elastic, compressible rubber material and the core 9, 10, 11, 12 of each wedge element 1, 2, 3, 4 is made of a composite material. The core 9, 10, 11, 12 of respective wedge element 1, 2, 3, 4 is made to be strong enough to withstand the expected forces without being compressed.

In other embodiments one or more of the wedge elements 1, 2, 3, 4 are made solely of a compressible material, such as rubber. In one example the first and second wedge elements 1, 2 have a core 9, 10 of harder material, while the third and fourth wedge elements 3, 4 are made solely of a rubber material. According to a further example the third and fourth wedge elements 3, 4 have a core 11, 12 of harder material, while the first and second wedge elements 1, 2 are made solely of a rubber material. In still a further embodiment all the wedge elements 1, 2, 3, 4 are made solely of a rubber material.

The first and second wedge elements 1, 2 are arranged in line with each other and are moveable towards and away from each other. The third and fourth wedge elements 3, 4 are placed above each other and are moveable towards and away from each other. The third and fourth wedge elements 3, 4 are placed between the first and second wedge elements 1, 2. The first wedge element 1 abuts the third wedge element 3 and the fourth wedge element 4 along sloping surfaces. The second wedge element 2 abuts the third wedge element 3 and the fourth wedge element 4 along sloping surfaces. The wedge elements 1, 2, 3, 4 and their co-operating sloping surfaces are arranged in such a way that when the first wedge element 1 and the second wedge element 2 are moved toward each other the third wedge element 3 and the fourth wedge element 4 are moved away from each other. Correspondingly, when the first wedge element 1 and the second wedge element 2 are moved away from each other the third wedge element 3 and the fourth wedge element 4 are allowed to move toward each other. The first wedge element 1 and the second wedge element 2 each have a through opening. Said through openings are placed in line with each other in the assembled wedge. The through opening of the first wedge element 1 has a larger diameter at a part facing away from the second wedge element 2 than at a part facing the second wedge element 2. Thereby, a stop edge 18 is formed inside the through opening of the first wedge element 1. The purpose of said stop edge 18 will be explained below.

The screw 6 of the wedge is placed in through openings of the first wedge element 1 and the second wedge element 2, respectively. The end of the screw 6 placed inside the second wedge element 2 has an outer thread 13. The opposite end of the screw 6, i.e. the end placed at the first wedge element 1, has also an outer thread 14, except for an outermost, coloured end 15. The function of said coloured end 15 will be explained below. In some embodiments all of the end part, that is between the outer end and the thread 14, is coloured, while in other embodiments only the end surface is coloured. In one embodiment the end is given a red colour. The outer diameter of the thread 14 placed at the first wedge element 1 is larger then the outer diameter of the coloured end 15 and the rest of the screw 6. Stop edges 16, 17 are thereby formed at the junctions between the thread 14 and the coloured end 15 and between the thread 14 and the rest of the screw 6, respectively. The function of said stop edges 16, 17 will be explained below.

The socket 7 of the wedge has a tubular part 19 and forms a nut 20 at one end opposite the tubular part 19. A flange 21 is formed between the tubular part 19 and the nut 20, which flange 21 projects outwardly around the circumference of the tubular part 19 and is perpendicular to the tubular part 19. The socket 7 is made in one piece. A groove 22 is arranged on the outside of the tubular part 19, which groove 22 goes all around the circumference of the tubular part 19. The groove 22 is placed at a short distance from the flange 21 of the socket 7. The socket 7 has a through opening 35. The inside of the through opening 35 is given a colour, at least in the area of the nut 20. In one embodiment the colour inside the through opening 35 is red. The diameter of the through opening 35 is larger inside the tubular part 19 than inside the flange 21 and the nut 20. A stop edge 23 is thereby formed inside the through opening 35 of the socket 7. The through opening 35 has an inner thread in the area of the tubular part 19. The purpose of the threaded through opening 35, the stop edge 23, the flange 21, the colour and the groove 22 of the socket 7 will be explained below.

The nut 8 has a tubular part 24 at one end, having an outer thread. A polygonal part 25 follows the tubular part 24 and then comes an outer end 26. The outer end 26 is circular and chamfers towards the free end. Inside the tubular part 24 and the polygonal part 25 an inner opening 27 is arranged going from the free end of the tubular part 25 up to the outer end 26. There is no opening in the outer end 26. The inner opening 27 has an inner thread. The nut 8 is made in one piece. The purpose of the threads and the polygonal part 25 will be explained below.

Figure 4:
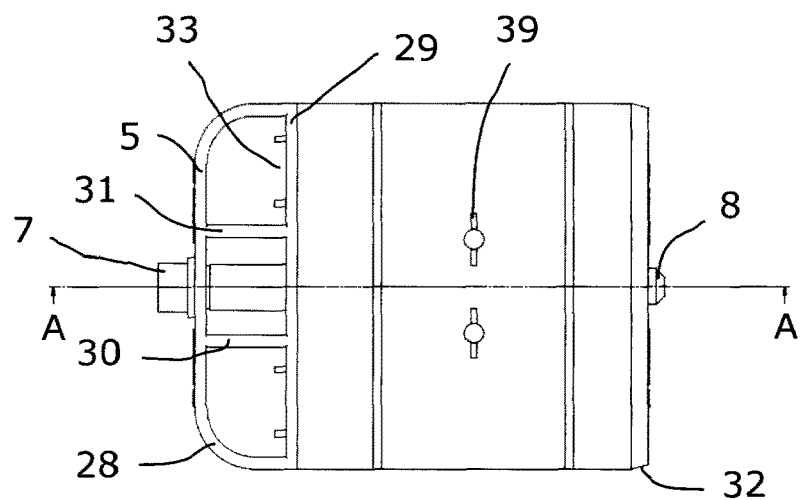
FIG. 4 is a plan view of the wedge of FIGS. 2 and 3 in a non-compressing state.

The handle 5 is integrated with the core 9 of the first wedge element 1. The handle 5 comprises an arc 28, an attachment plate 29 and two struts 30, 31, extending between the arc 28 and the attachment plate 29. The attachment plate 29 abuts the outer softer material of the first wedge element 1 and extends over the total width of the wedge. The arc 28 is placed at opposite ends of the attachment plate 29 and goes via two bent parts over into a straight part. The straight part of the arc 28 is placed at a distance from the attachment plate 29 and is parallel with the attachment plate 29. The straight part of the arc 28 has a through opening placed in the centre of said straight part. Also the attachment plate 29 has a through opening placed in line with the through opening of the arc 28. The struts 30, 31 are placed at a distance from each other, which distance should be at least big enough to give room for the socket 7. Furthermore, the attachment plate 29 has tag holders 33 placed on the side facing away from the first wedge element 1. As shown in FIG. 4 the wedge has a chamfer 32 at the outer end of the second wedge element 2, in order to facilitate insertion of the wedge into a frame. Normally all of the handle 5 and the core 9 of the first wedge element 1 are made in one piece.

The third and fourth wedge elements 3, 4 are connected to each other by two spring arrangements. Each spring arrangement comprises a spring 37, a rod 38 and two pins 39, in the shown embodiment. The spring 37 is placed surrounding the rod 38 in through openings of the third and fourth wedge elements 3, 4, which trough openings are placed in line with each other. At the mouth of each through opening on the outside of the third wedge element 3 and the fourth wedge element 4, respectively, there is an elongated groove crossing said mouth. Each end of the spring 37 is hooked around one of the pins 39, which pins 39 then are placed in one groove each. In an alternative embodiment each spring arrangement has no rod 38, whereby it only comprises the spring 37 and the two pins 39. By means of the spring arrangements the third and fourth wedge elements 3, 4 will be urged in a direction towards each other.

A tag 34, such as a RFID tag, can be placed in one of the tag holders 33 of the handle 5. Due to the arc 28 of the handle the tag 34 is relatively well protected. To not risk disturbing the function of the tag 34 the handle 5 is made in a suitable composite material having no metal.

The nut 8 shown in FIGS. 11 and 12 is fastened inside the second wedge element 2. The second wedge element 2 is in one embodiment injection moulded around the tubular part 24 and the polygonal part 25 of the nut 8. The material of the second wedge element 2 will then go into the outer thread of the tubular part 25 and be placed abutting all of the sides of the polygonal part 25 of the nut 8. The nut 8 will thereby be held firmly inside the second wedge element 2 and be hindered to do any axial or rotational movements. The end opposite the coloured end 15 of the screw 6 is inserted into the nut 8. The screw 6 is screwed into the inner opening 27 of the nut, by means of co-operation between the thread 13 of the screw 6 and the thread of the inner opening 27 of the nut 8. The end of the screw 6 is locked from rotating inside the threaded opening 27 of the nut 8 by the use of a threadlocker. A threadlocker or thread-locking fluid is a thin, single-component adhesive, applied to the threads of fasteners such as screws and bolts to prevent loosening, leakage and corrosion. The screw 6 may be locked inside the nut 8 also by using other types of adhesives.

In FIG. 14 a nut 40 according to an alternative embodiment is shown. The nut 40 has outer flutes or an outer thread and an inner thread. The nut 40 is fastened inside a second wedge element 41 having an alternative embodiment. In this alternative embodiment the nut 40 is placed inside the second wedge element 41 without going through the second wedge element 41. None of the other parts of the wedge need to be adapted to the nut 40 and the second wedge element 41 according to these alternative embodiments. In the same way as described above the second wedge element 41 is injection moulded around the nut 40. The second wedge element 41 is formed with an opening 42 going from the edge to be facing the first wedge element 1 up to the nut 40. The screw 6 is to be received in the nut 40 in the same way as described above. Thus, the screw 6 is locked inside the nut 40 by means of a threadlocker. Apart from the second wedge element 41 and the nut 40, the wedge of this alternative embodiment corresponds with the wedge as described in connection with FIGS. 2-13.

In the alternative embodiment for the second wedge element 43 indicated in FIG. 16, the thread 13 of the screw 6 arranged at the end opposite the coloured end 15 of the screw, is arranged directly in the second wedge element 43. Thus, in this case there is no nut inside the second wedge element 43. In the shown embodiment the second wedge element 43 has a core 44 of a harder material than the outer part of the second wedge element 43. In one embodiment the screw 6 is received in the second wedge element 43 in that the thread 13 of the screw 6 mesh with a thread inside an opening of the second wedge element 43. In the same way as described above, the screw 6 is locked inside the second wedge element 43 by means of a thread-locking fluid or threadlocker. In an alternative the core 44 of the second wedge element 43 is injection moulded around the thread 13 of the screw 6. Thus, the screw 6 and the second wedge element 43 are fixed to each without being mutually moveable in any direction including rotational direction. Apart from the second wedge element 43, the wedge of this alternative embodiment corresponds with the wedge as described in connection with FIGS. 2-13.

As stated above the screw 6 goes through a through opening of the first wedge element 1. In the assembled condition of the wedge the screw 6 goes between the third wedge element 3 and the fourth wedge element 4, respectively.

The socket 7 is placed going through a central through opening of the arc 28 of the handle 5 and through a central through opening of the attachment plate 29 of the handle 5. The coloured end 15 of the screw 6 is received inside the socket 7, whereby the thread 14 at the coloured end 15 of the screw 6 is received in the thread in the through opening 35 of the socket 7. Thus, by means of the thread of respective part the position of the coloured end 15 of the screw 6 may be varied inside the through opening 35 of the socket 7. The socket 7 is held at the arc 28 of the handle 5 by means of a locking ring 36 being placed in the groove 22 on the outside of the tubular part 19 of the socket 7. The socket 7 is held by the locking ring 36 in a rotatable way. The arc 28 is placed between the flange 21 of the socket 7 and the locking ring 36 placed in the groove 22 of the socket 7. To hold the socket 7 at the handle 5 the distance between the flange 21 and the groove 22 of the socket 7 should about correspond with the thickness of the arc 28 of the handle 5.

In the assembled wedge the screw 6 is held stationary in relation to the second wedge element 2, without any rotation or axial movement, but may move axially in relation to the socket 7, by means of rotation for the socket 7 on the screw 6.

In one embodiment there is no socket. In stead the screw is held rotatable at the handle, and not moveable in an axial direction of the screw. In the same way as for the socket described above the screw is held at the handle, in that the handle is placed between a flange and a lock ring received in a groove of the screw. The screw has a nut-form at the end of the screw placed at the handle, whereby the nut-formed end will be placed outside the handle. In this embodiment the screw is rotated inside the nut placed in the second wedge element, whereby the screw will be moved further into the nut in rotation in one direction and less into the nut in rotation in the opposite direction. As the first and second wedge elements are fixed to the screw and the nut, respectively, the first and second wedge elements will be moved toward each other or away from each other depending on the direction of rotation for the screw.

Figure 5:
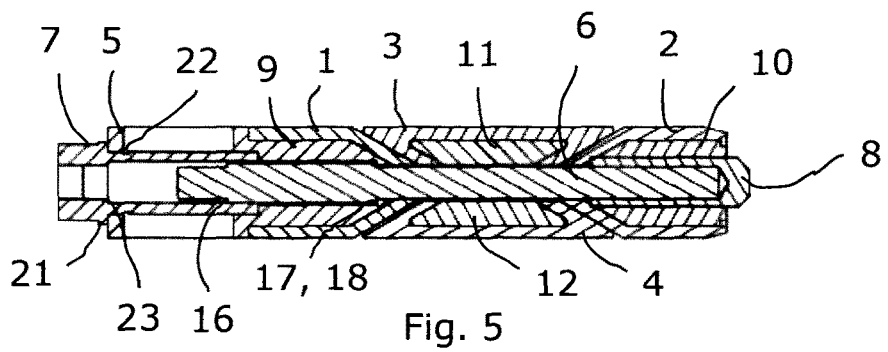
FIG. 5 is a sectional view of the wedge taken along the line A-A in FIG. 4 and in a non-compressing state.
Figure 6:
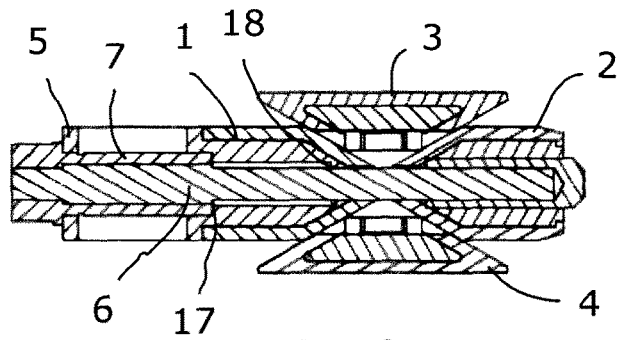
FIG. 6 is a sectional view corresponding to FIG. 5 but with the wedge in a compressing state.
Figure 7:
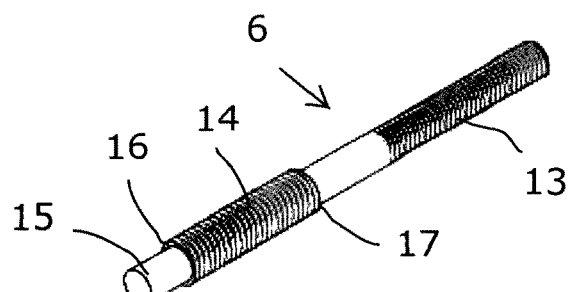
FIG. 7 is a perspective view of a screw forming a part of the wedge in one embodiment of the present invention.
Figure 8:
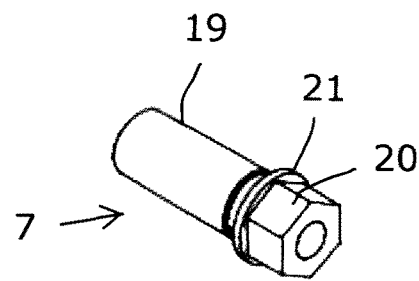
FIG. 8 is a perspective view of a socket forming a part of the wedge in one embodiment of the present invention.

In use the wedge is moveable between two extremes. In a first extreme, as shown in FIG. 5, an upper surface of the third wedge element 3 is about flush with an upper surface of the first wedge element 1 and an upper surface of the second wedge element 2 and a lower surface of the fourth wedge element 4 is about flush with a lower surface of the first wedge element 1 and a lower surface of the second wedge element 2. This first extreme of the wedge could be called a flattened out position, as the wedge is as thin as it gets in that position. In said extreme the third and fourth wedge elements 3, 4 are abutting or are placed close to the screw 6. The third and fourth wedge elements 3, 4 each have a recess in the area of the screw 6. In the first extreme the third and fourth wedge elements 3, 4 will abut each other or be placed closed to each other in the area outside of respective recess. In a second extreme, as shown in FIG. 6, the first and second wedge elements 1, 2 are moved as close to each other as they can be moved and the third and fourth wedge elements 3, 4 are moved as far apart from each other as they can be moved. In the second extreme the wedge is as thick as it gets. The wedge may assume any position between the extremes, but in use it is normally placed in one of said extremes. It is placed in the first extreme for insertion into the frame and in the second extreme in order to give the predetermined compression inside the frame.

In the first extreme the stop edge 17 at the inner end of the thread 14 placed at the coloured end 15 of the screw 6 will abut the stop edge 18 inside the through opening of the first wedge element 1. These stop edges 17, 18 will give a distinct stop of the movement flattening the wedge out. In the second extreme the stop edge 16 at the coloured end of the screw 6 will abut the stop edge 23 in the through opening 35 of the socket 7, giving a distinct stop in said second extreme. Said stop edge 23 of the through opening 35 of the socket 7 is placed in such a position that the coloured end 15 of the screw 6 will be flush with the outer end of the nut 20 of the socket 7. The length of the coloured end of the screw 6, that is the part placed between the free end and the thread 14, correspond with the length of the through opening 35 inside the nut 20 and flange 21 of the socket 7. Thus, in the second extreme of the wedge the coloured end of the screw 6 will be clearly visible at the mouth of the through opening 35 of the socket 7. In said second extreme of the wedge the inner coloured surface of the through opening 35 of the socket 7 will no longer be visible.

The wedge is normally placed inside the frame 101 with the wedge in the first extreme, whereby no compression force will be exerted on the modules 102 inside the frame 101. When the wedge is in the second extreme it will exert maximal compression force on the modules 102 inside the frame 101.

By giving the coloured end 15 of the screw 6 and the inner surface of the through opening 35 of the socket 7 different colours, it will be possible to get an indication that the wedge is in the second extreme. In one embodiment the coloured end of the screw 6 is green, while the inner surface of the opening 35 of the socket 7 is red. Thereby, in the second extreme there will be a green "dot" at the centre of the nut 20 of the socket 7. As soon as the wedge is not in the second extreme at least a part of the red inner surface of the through opening 35 of the socket 7 will be visible. The further the wedge is moved from the second extreme the more of the red inner surface of the through opening 35 of the socket 7 will become visible. Thus, when nothing of the red inner surface of the through opening 35 of the socket 7 is visible, it indicates that the wedge is in the second extreme, giving maximal compression inside the frame 101.

The relationship between the outer end of the screw 6 and the through opening 35 of the socket 7 can also be used as a tactile indication of the compression. As long as one can feel that the end of the screw 6 is not flush with the outer end of the through opening 27 of the socket 7, the socket 7 is not yet screwed all the way to give maximal compression. Put in other words the wedge has not yet reached the second extreme. The tactile indication is vital for installations having poor visibility.

The visible and tactile indications as indicated above is not only beneficial for the fitter but also for any supervisor, which will be given a direct indication whether the wedge is properly installed.

By rotating the socket 7, e.g. by means of a wrench placed on the nut 20 of the socket 7, in a first direction the wedge will go towards the first extreme and by rotating the socket in the opposite direction the wedge will go towards the second extreme. By rotation of the socket 7 the screw 6 will be moved axially in relation to the socket 7. This relative axial movement between the screw 6 and the socket 7 is given by co-operation between the threads 14 at the coloured end 15 of the screw 6 and the threads of the through opening 35 of the socket 7. By said relative axial movement between the screw 6 and the socket 7 the first and second wedge elements 1 and 2 are given a corresponding relative axial movement, moving the first and second wedge elements 1, 2 towards or away from each other, depending on the rotational direction of the socket 7. When the first and second wedge elements 1, 2 are moved towards each other the third and fourth wedge elements 3, 4 will be forced away from each other, sliding along the sloping surfaces of the first and second wedge elements 1, 2, respectively. When the first and second wedge elements 1, 2 are moved away from each other the third and fourth wedge elements 3, 4 are allowed to move toward each other, sliding along the sloping surfaces of the first and second wedge elements, 1, 2, respectively. The third and fourth wedge elements 3, 4 will be urged towards each other by means of the springs 37 connected to pins 39 placed in grooves on the outer surfaces of the third and fourth wedge elements 3, 4 and by means of the elastic modules 102 inside the frame 101.

The wedge is normally inserted into a frame in the flattened out condition, which is the first extreme of the wedge as defined above. The chamfers 32 at the outer end of the second wedge element 2 facilitate insertion of the wedge into the frame. If the wedge is to be removed from the frame the wedge is brought to the first extreme and then the wedge is drawn out by gripping the handle 5.

The invention claimed is:

1. A wedge comprising a first wedge element, a second wedge element, a third wedge element, and a fourth wedge element, wherein:
    (a) the first and second wedge elements are arranged moveable towards and away from each other, the third and fourth wedge elements are placed on opposite sides of the first and second wedge elements and abutting the first and second wedge elements along sloping surfaces, and the wedge elements and the sloping surfaces are so arranged that the third and fourth wedge elements move away from each other when the first and second wedge elements are moved toward each other and the third and fourth wedge elements are free to move toward each other when the first and second wedge elements are moved away from each other; and
    (b) the first and second wedge elements move towards and away from each other by means of a first part comprising a socket arranged rotatable but fixed in relation to the first wedge element and a second part comprising a screw arranged non-rotatable and fixed in relation to the second wedge element, wherein the second and first parts have threads in mesh with each other and that the wedge is movable between two extremes, which extremes each is defined by one stop edge of the screw and a stop edge of an adjacent part.

2. The wedge of claim 1, wherein the second part further comprises a nut, wherein the screw has an outer thread for co-operation with an inner thread of an inner opening of the nut and wherein the screw is fixed in the inner opening of the nut by means of a threadlocker.

3. The wedge of claim 2, wherein one end of the screw is received in a through opening of the socket and wherein the through opening of the socket has a thread for co-operation with an outer thread of the screw.

4. The wedge of claim 2, wherein the nut comprises a tubular part, having an outer thread, and an adjoining polygonal part, whereby the second wedge element is formed around the tubular part and the polygonal part.

5. The wedge of claim 1, wherein the second part is a screw fixed to the second wedge element.

6. The wedge of claim 1, wherein the socket comprises a tubular part and an adjoining nut, whereby there is an outwardly projecting flange on the nut adjacent the tubular part and a circumferential groove on the tubular part placed at a distance from the nut of the socket.

7. The wedge of claim 6, wherein the socket is fastened to a handle fixed to the first wedge element, whereby the handle is placed between the flange of the socket and a locking ring received in the groove of the tubular part of the socket.

8. The wedge of claim 1, wherein the thread of the screw placed inside the socket has a larger outer diameter than the adjacent parts of the screw, whereby stop edges are formed at opposite ends of said thread, wherein the diameter of the through opening is larger in the area of the tubular part of the socket than in the part of the nut of the socket, whereby a stop edge is formed and wherein the diameter of the through opening of the first wedge element is larger at the part facing away from the second wedge element than at the part facing the second wedge element, whereby a stop edge is formed inside the through opening of the first wedge element.

9. The wedge of claim 8, wherein the stop edges of the screw, the stop edge of the through opening of the socket and the stop edge of the through opening of the first wedge element are arranged in such a way that the wedge reaches a first extreme when the stop edge on the side of the thread of the screw facing the second wedge element hits the stop edge in the through opening of the first wedge element and that the wedge reaches a second extreme when the stop edge on the side of the thread of the screw facing away from the second wedge element hits the stop edge of the through opening of the socket.

10. The wedge of claim 1, wherein the third wedge element and the fourth wedge element are urged towards each other by means of spring arrangements.

11. The wedge of claim 10, wherein each spring arrangement comprises a spring, and two pins, wherein the spring is received in through openings of the third and fourth wedge elements, whereby opposite ends of the spring is fastened to one of the pins each and which pins are received in grooves on the outer of surfaces of the third and fourth wedge elements, respectively.

12. The wedge of claim 11, wherein each spring arrangement further comprises a rod placed inside the spring.

* * * * *